(12) United States Patent
Sakata et al.

(10) Patent No.: US 11,457,298 B2
(45) Date of Patent: Sep. 27, 2022

(54) DISPLAY DEVICE

(71) Applicant: SONY GROUP CORPORATION, Tokyo (JP)

(72) Inventors: Tatsuya Sakata, Tokyo (JP); Hiroaki Maeshiba, Tokyo (JP); Daisuke Yamaoka, Tokyo (JP); Junji Hagio, Tokyo (JP); Hiroshi Masuda, Tokyo (JP)

(73) Assignee: SONY GROUP CORPORATION, Tokyo (JM)

( * ) Notice: Subject to any disclaimer, the term of this patent is extended or adjusted under 35 U.S.C. 154(b) by 0 days.

(21) Appl. No.: 17/414,639

(22) PCT Filed: Nov. 6, 2019

(86) PCT No.: PCT/JP2019/043467
§ 371 (c)(1),
(2) Date: Jun. 16, 2021

(87) PCT Pub. No.: WO2020/137177
PCT Pub. Date: Jul. 2, 2020

(65) Prior Publication Data
US 2022/0053253 A1    Feb. 17, 2022

(30) Foreign Application Priority Data

Dec. 26, 2018   (JP) .............................. JP2018-243649

(51) Int. Cl.
*H04R 1/02* (2006.01)
*H04N 5/64* (2006.01)
(Continued)

(52) U.S. Cl.
CPC ............. *H04R 1/028* (2013.01); *H04N 5/642* (2013.01); *H04R 1/2819* (2013.01); *H04R 1/403* (2013.01); *H04R 2499/15* (2013.01)

(58) Field of Classification Search
CPC ...... H04R 1/028; H04R 1/2819; H04R 1/403; H04R 2499/15; H04R 1/02; H04N 5/642
See application file for complete search history.

(56) References Cited

U.S. PATENT DOCUMENTS 5,361,380 A * 11/1994 You ..................... H04R 1/2888
                                                                381/349
6,533,063 B1 * 3/2003 Ikeuchi .................... H04R 5/02
                                                                181/175
(Continued)

FOREIGN PATENT DOCUMENTS

CN           101142846 A       3/2008
EP            1881730 A1       1/2008
(Continued)

OTHER PUBLICATIONS

International Search Report and Written Opinion of PCT Application No. PCT/JP2019/043467, dated Dec. 10, 2019, 06 pages of ISRWO.

(Continued)

*Primary Examiner* — Jason R Kurr
(74) *Attorney, Agent, or Firm* — Chip Law Group

(57) ABSTRACT

Provided is a display device that includes a display on which an image is displayed on a display surface, a rear cover arranged on a back surface side of the display, and an upper speaker and a lower speaker arranged between the display and the rear cover and located so as to be separated vertically from each other, in which an upper slit functioning as a passage hole for sound output from the upper speaker is located above the display, a lower slit functioning as a passage hole for sound output from the lower speaker is located below the display, and a vertical width of the lower slit is larger than a vertical width of the upper slit.

15 Claims, 13 Drawing Sheets

(51) Int. Cl.
H04R 1/28 (2006.01)
H04R 1/40 (2006.01)

(56) References Cited

U.S. PATENT DOCUMENTS

| | | | |
|---|---|---|---|
| 8,818,006 | B2 | 8/2014 | Yamauchi et al. |
| 2009/0080681 | A1 | 3/2009 | Hamada et al. |
| 2013/0128130 | A1 | 5/2013 | Yamauchi et al. |
| 2014/0247959 | A1 | 9/2014 | Yamanaka et al. |
| 2015/0117686 | A1 | 4/2015 | Kim et al. |
| 2015/0163574 | A1* | 6/2015 | Hamadate .............. H04R 1/345 381/388 |
| 2015/0358706 | A1* | 12/2015 | Hirayama .............. H04N 5/642 381/333 |
| 2016/0014367 | A1* | 1/2016 | Yeo ........................ H04N 5/642 348/836 |
| 2017/0026726 | A1* | 1/2017 | Kim ........................ H04R 1/028 |
| 2017/0070839 | A1* | 3/2017 | Mihelich ................. H04R 5/02 |
| 2020/0099883 | A1* | 3/2020 | Buck .................... H04N 5/2257 |

FOREIGN PATENT DOCUMENTS

| | | |
|---|---|---|
| JP | 2006-319723 A | 11/2006 |
| JP | 5010810 B2 | 8/2012 |
| JP | 2012-244314 A | 12/2012 |
| JP | 2014-131243 A | 7/2014 |
| JP | 5626461 B2 | 11/2014 |
| JP | 6015497 B2 | 10/2016 |
| KR | 10-2007-0096022 A | 10/2007 |
| KR | 2015-0047411 A | 5/2015 |
| TW | 200704174 A | 1/2007 |
| WO | 2006/120912 A1 | 11/2006 |
| WO | 2012/153537 A1 | 11/2012 |
| WO | 2015/060678 A1 | 4/2015 |

OTHER PUBLICATIONS

Extended European Search Report of EP Application No. 19902102.3, dated Jan. 27, 2022, 09 pages.

* cited by examiner

DISPLAY DEVICE

CROSS REFERENCE TO RELATED APPLICATIONS

This application is a U.S. National Phase of International Patent Application No. PCT/JP2019/043467 filed on Nov. 6, 2019, which claims priority benefit of Japanese Patent Application No. JP 2018-243649 filed in the Japan Patent Office on Dec. 26, 2018. Each of the above-referenced applications is hereby incorporated herein by reference in its entirety.

TECHNICAL FIELD

The present technology relates to a technical field of a display device having a display on which an image is displayed on a display surface and outputting sound from a speaker.

BACKGROUND ART

Some display devices such as television receivers and personal computers are provided with a display having a display surface on which images are displayed, speakers and the like are arranged on a back surface side of the display, and the speakers and the like are covered from the back surface side by a rear cover (see, for example, Patent Document 1).

In a display device disclosed in Patent Document 1, a speaker is arranged on a back surface side at a lower end portion of a display, and the speaker is covered from the back surface side by a rear cover. A slit functioning as a passage hole for sound output from the speaker is located on a lower side of the display, and the sound output from the speaker passes through the lower side of the display and goes forward from the slit.

CITATION LIST

Patent Document

Patent Document 1: Japanese Patent Application Laid-Open No. 2006-319723

SUMMARY OF THE INVENTION

Problems to be Solved by the Invention

By the way, when viewing a display device, a user listens to sound while visually recognizing an image or video displayed on a display, and therefore, a state where the user recognizes as if the sound is being output from the display that the user is viewing so that a sense of unity between the image or video and the sound is created is a desired viewing state.

Accordingly, the viewing state in which the sound is recognized as being heard from the surroundings of the display lacks a sense of unity between an image or video and sound, and there is a possibility that a user feels uncomfortable in hearing the sound in relation to the image or video, and preferable sound image localization is not achieved.

Therefore, an object of a display device of the present invention is to enhance a sound image localization effect to ensure a preferable viewing state in which a sense of unity between an image or video and sound is generated.

Solutions to Problems

First, a display device according to the present technology includes: a display on which an image is displayed on a display surface; a rear cover arranged on a back surface side of the display; and an upper speaker and a lower speaker arranged between the display and the rear cover and located so as to be separated vertically from each other, in which an upper slit functioning as a passage hole for sound output from the upper speaker is located above the display, a lower slit functioning as a passage hole for sound output from the lower speaker is located below the display, and a vertical width of the lower slit is larger than a vertical width of the upper slit.

Therefore, the sound output from the upper speaker passes through the upper slit located above the display, and the sound output from the lower speaker passes through the lower slit that is located below the display and has a vertical width larger than a vertical width of the upper slit.

Secondly, in the display device described above, it is desirable that a plurality of at least one of the upper slit or the lower slit is formed so as to be separated vertically from each other, and the number of the lower slit is larger than the number of the upper slit.

Therefore, it possible to make an opening area of the lower slit larger than an opening area of the upper slit without changing the vertical widths of the upper slit and the lower slit.

Thirdly, in the display device described above, it is desirable that an outer frame that covers the display from an outer peripheral side is provided, and the upper slit and the lower slit are formed in the outer frame.

Therefore, the display is covered from the outer peripheral side by the outer frame, and sound is output from the upper slit and the lower slit, which are spaces formed in the outer frame.

Fourthly, in the display device described above, it is desirable that two of the upper speakers and two of the lower speakers are arranged so as to be separated horizontally from each other.

Therefore, sound is output from each of the upper speakers and the lower speakers located vertically and horizontally.

Fifthly, in the display device described above, it is desirable that at least a part of the upper speaker is arranged on the back surface side at an upper end portion of the display, and at least a part of the lower speaker is arranged on the back surface side at a lower end portion of the display.

Therefore, a position of the upper speaker with respect to the upper slit becomes closer, and a position of the lower speaker with respect to the lower slit becomes closer.

Sixthly, in the display device described above, it is desirable that a part of the upper speaker is located above the display.

Therefore, the entire upper speaker is not located above the display.

Seventhly, in the display device described above, it is desirable that the upper speaker includes a sound output unit that outputs sound, and a metal plate that faces the sound output unit in an output direction of sound from the sound output unit, and is located below the upper slit.

Therefore, at least part of the sound output from the upper speaker goes to the metal plate, so that the sound output from the upper speaker is hard to be absorbed.

Eighthly, in the display device described above, it is desirable that the metal plate of the upper speaker is inclined upward and diagonally forward.

Therefore, part of the sound output from the upper speaker is guided toward the upper slit by the metal plate.

Ninthly, in the display device described above, it is desirable that a part of the lower speaker is located below the display.

Therefore, the entire lower speaker is not located below the display.

Tenthly, in the display device described above, it is desirable that the lower speaker includes a sound output unit that outputs sound, and a metal plate that faces the sound output unit in an output direction of sound from the sound output unit, and is located above the lower slit.

Therefore, at least part of the sound output from the lower speaker goes to the metal plate, so that the sound output from the lower speaker is hard to be absorbed.

Eleventhly, in the display device described above, it is desirable that the metal plate of the lower speaker is inclined downward and diagonally forward.

Therefore, part of the sound output from the lower speaker is guided toward the lower slit by the metal plate.

Twelfthly, in the display device described above, it is desirable that a bass speaker having a lower sound output band than the upper speaker and the lower speaker is arranged between the display and the rear cover, and the bass speaker is located between the upper speaker and the lower speaker in the vertical direction.

Therefore, the sound output from the bass speaker is output from between the upper speaker and the lower speaker in the vertical direction, so that the sound output from the bass speaker wraps around the back surface side of the display and is transmitted to the display surface side of the display.

Thirteenthly, in the display device described above, it is desirable that two of the upper speakers and two of the lower speakers are arranged so as to be separated horizontally from each other, and two of the bass speakers are arranged so as to be separated vertically from each other.

Therefore, the sound output from the two bass speakers each wraps around the back surface side of the display from above and below, and is easily transmitted to the display surface side of the display.

Fourteenthly, in the display device described above, it is desirable that two of the upper speakers and two of the lower speakers are arranged so as to be separated horizontally from each other, two of the bass speakers are arranged, and each of the two of the bass speakers is located between the upper speaker and the lower speaker.

Therefore, right channel sound is output from one of the left and right upper speakers, one of the bass speakers, and one of left and right lower speakers, left channel sound is output from the other one of the upper speakers, the other one of the bass speakers, and the other one of the lower speakers, so that it is possible to achieve stereo mode sound output.

MODE FOR CARRYING OUT THE INVENTION

Figure 1:
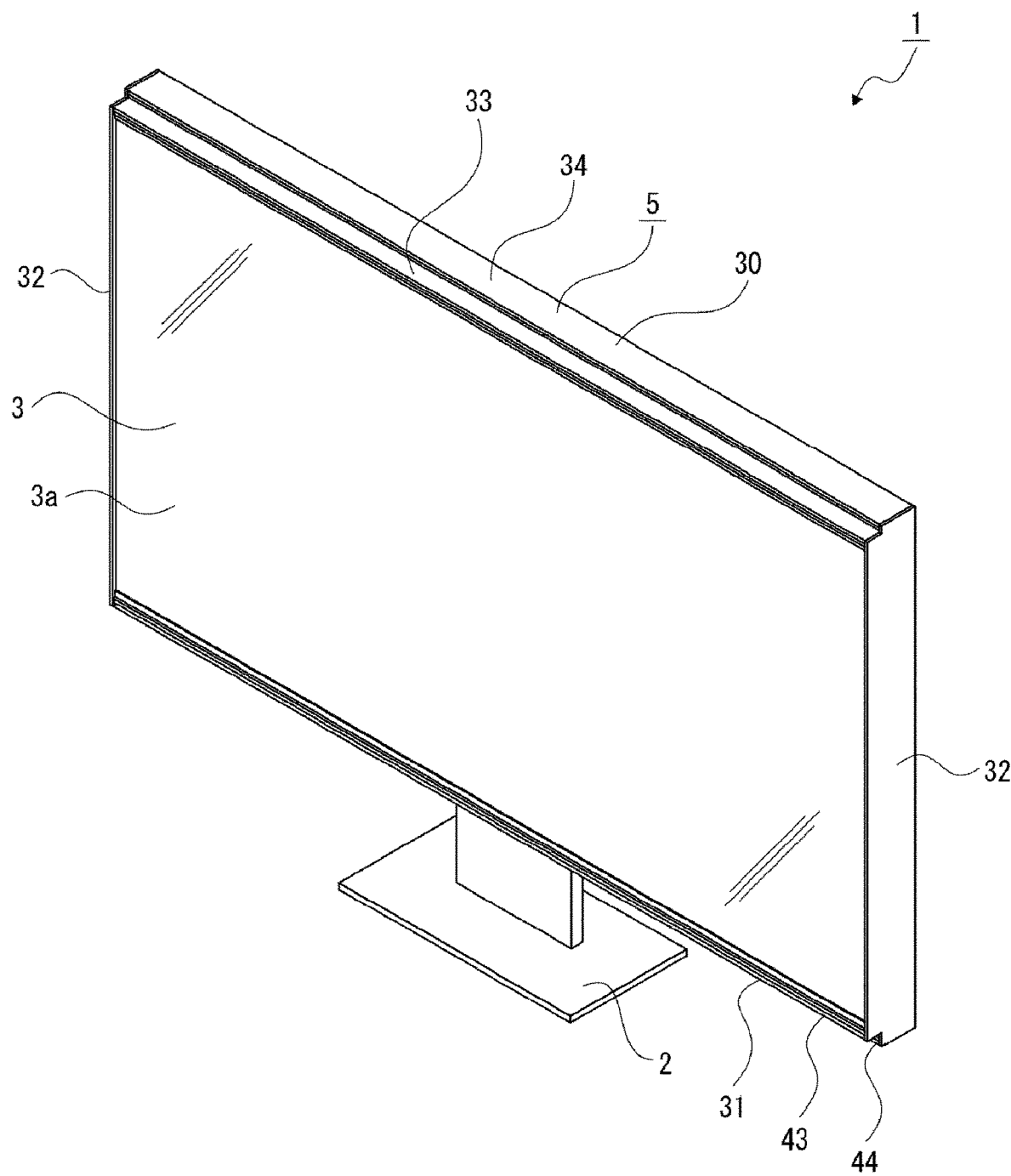
FIG. 1 illustrates a display device of the present technology together with FIGS. 2 to 15, and is a perspective view illustrating a front surface side of the display device.

Embodiments for implementing a display device of the present technology will be described below with reference to accompanying drawings.

In the embodiments shown below, the display device of the present technology is applied to a television receiver that displays an image on a display.

Note that the scope of application of the present technology is not limited to television receivers, and can be widely applied to various display devices such as monitors used in personal computers and the like.

In the description below, the front-back, up-down, left-right directions are shown defining the direction in which the display surface of the display device (television receiver) faces as the front side (front surface side).

<Configuration of Display Device>

A display device (television receiver) 1 is formed, for example, in a substantially rectangular shape that is horizontally long and thin in the front-rear direction (see FIGS. 1 and 2), and is used by being installed on an installation surface such as a floor surface by a stand 2, or attached to a wall surface with a bracket (not shown) or the like, for example.

The display device 1 includes: a display 3 on which an image is displayed; a back chassis 4 arranged behind the display 3; an outer frame 5 called a bezel arranged on an outer peripheral side of the display 3 and the back chassis 4; and a rear cover 6 that covers the back chassis 4 and the like from behind (see FIGS. 1 to 5).

The display 3 is formed in a plate shape facing in the front-rear direction, and as the display 3, for example, a liquid crystal display is used. The display 3 has an optical sheet such as a substrate and a polarizing film. The front surface of the display 3 is a display surface 3*a* on which an image is displayed (see FIG. 1).

Figure 3:
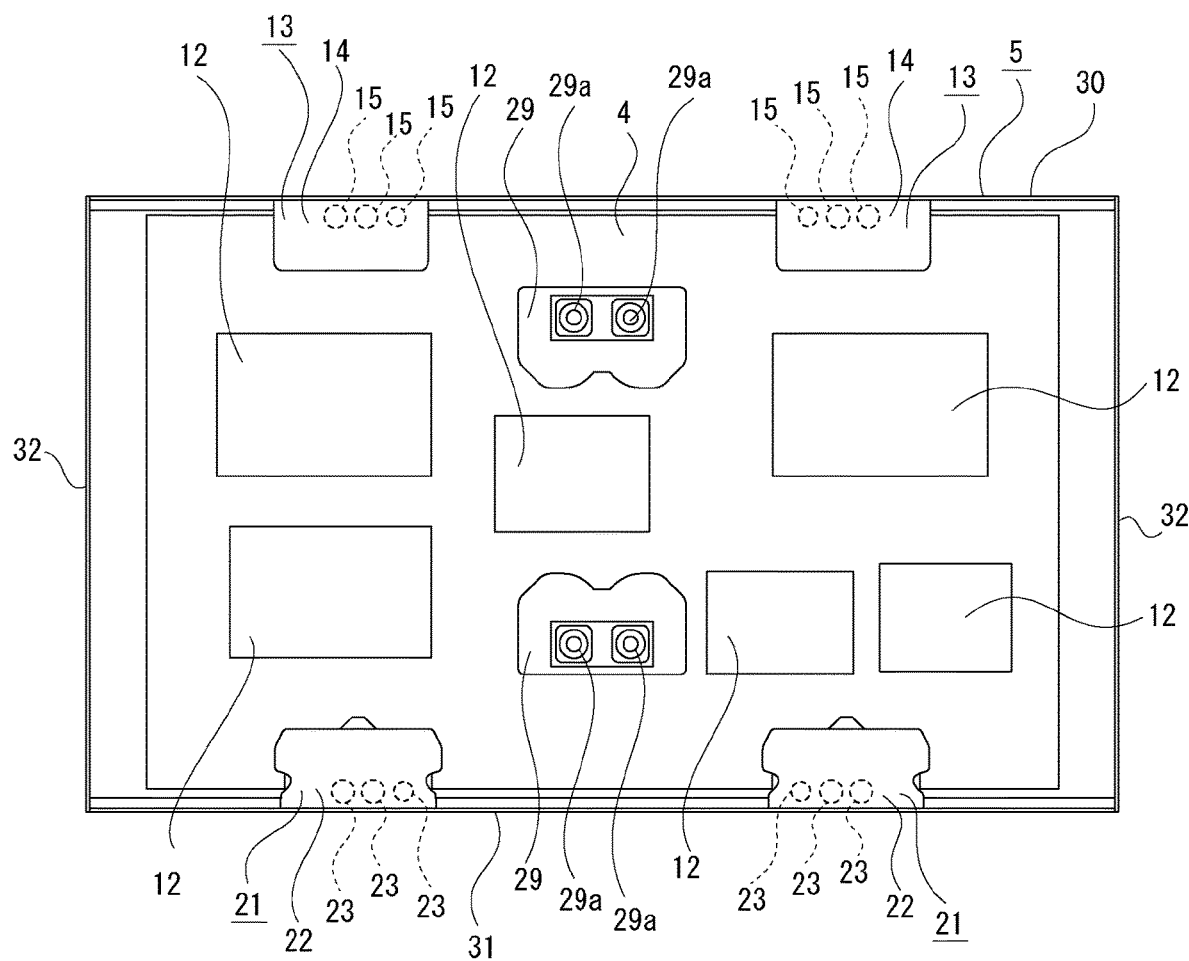
FIG. 3 is a rear view of the display device of which a rear cover is removed.
Figure 4:
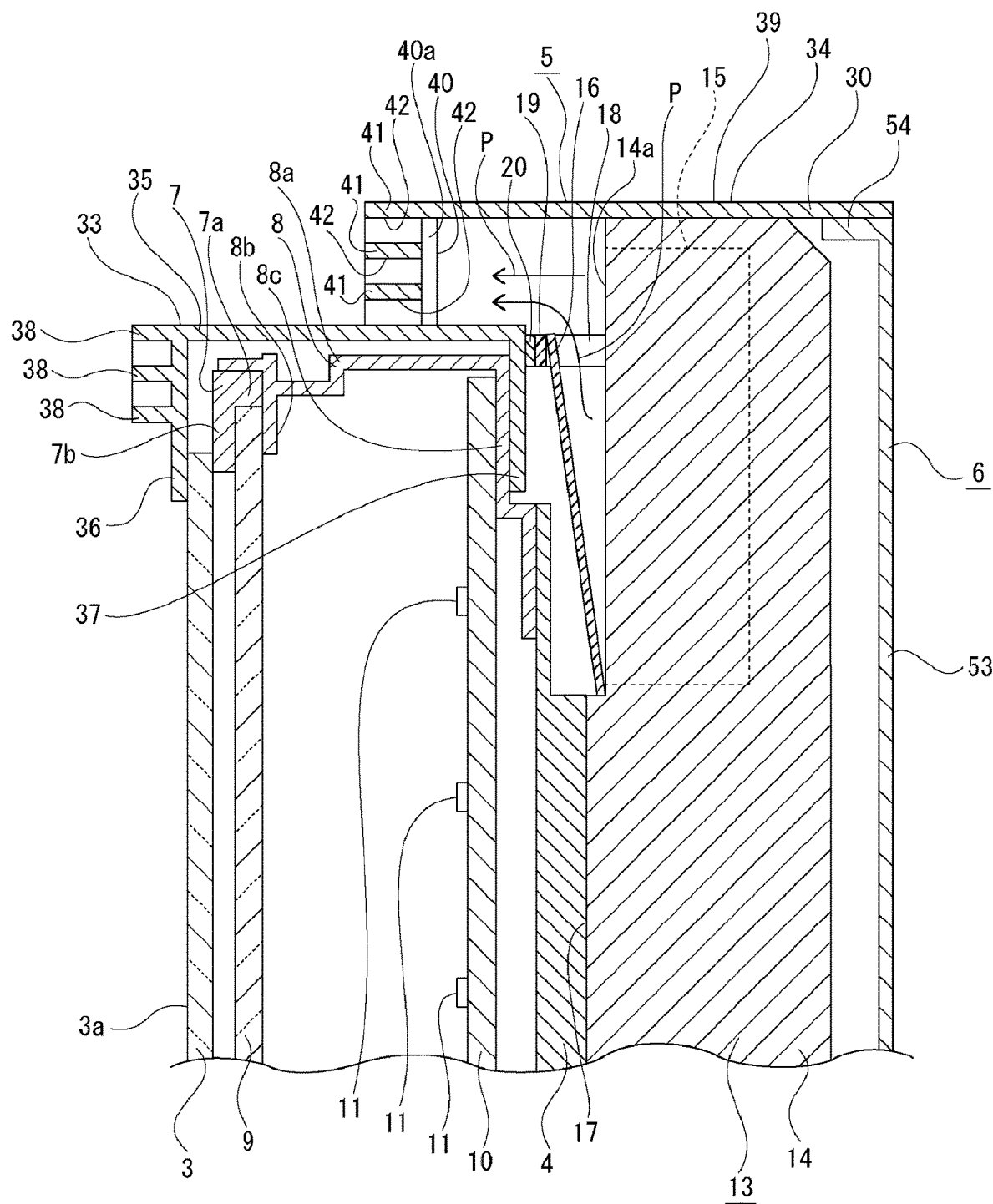
FIG. 4 is a cross-sectional view illustrating an upper end side of the display device.
Figure 5:
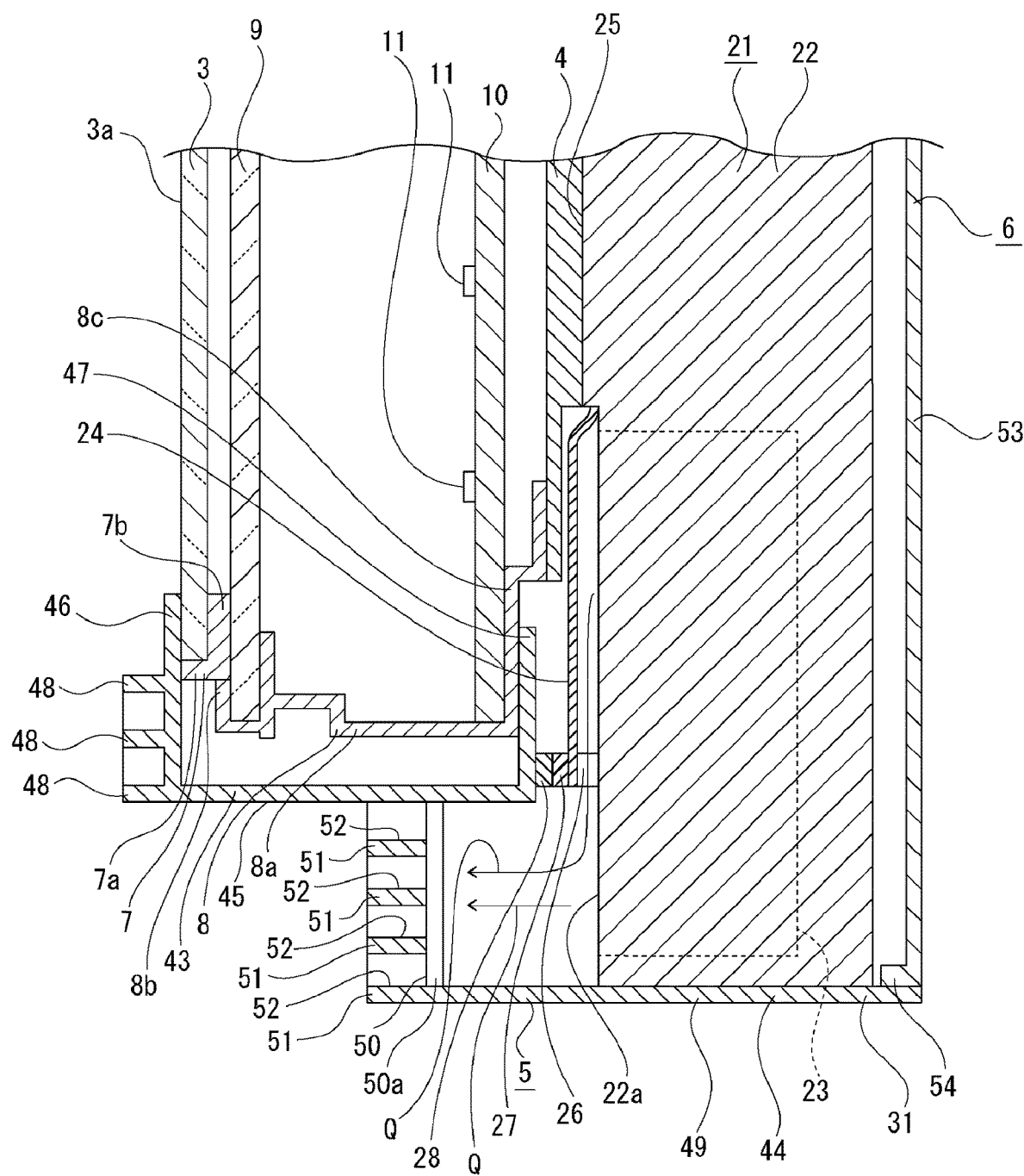
FIG. 5 is a cross-sectional view illustrating a lower end side of the display device.

The back chassis 4 is formed including, for example, a metal material, a resin material, or the like, and is arranged behind the display 3 (see FIGS. 3 to 5).

A holder 7 and a bracket 8 are arranged between the display 3 and the back chassis 4 (see FIGS. 4 and 5). The holder 7 has a rectangular frame-shaped portion 7*a* and a flange-shaped pressing portion 7*b* projecting inward from a front end portion of the frame-shaped portion 7*a*. The bracket 8 has: a rectangular frame-shaped base portion 8a; a flange-shaped holding portion 8b projecting inward from a portion near a front end of the base portion 8a; and a flange-shaped attachment portion 8c projecting inward from a rear end portion of the base portion 8a.

The frame-shaped portion 7a of the holder 7 and the holding portion 8b of the bracket 8 are coupled at the front and rear. An outer peripheral portion of the display 3 is joined to the front surface of the pressing portion 7b.

A diffuser plate 9 is arranged between the display 3 and the back chassis 4. The outer peripheral portion of the diffuser plate 9 is held in a state of being sandwiched from the front and back by the pressing portion 7b of the holder 7 and the holding portion 8b of the bracket 8.

An element mounting substrate 10 is attached to the bracket 8, and a plurality of light emitting elements 11, 11, . . . such as light emitting diodes that functions as a backlight is mounted in a matrix on the front surface of the element mounting substrate 10. The light emitted from the light emitting elements 11, 11, . . . is diffused by the diffuser plate 9 and incident on the display 3 as light of a backlight from the back surface side.

The back chassis 4 is formed in a flat plate shape that faces substantially the front-rear direction, and the outer shape of the back chassis 4 is smaller than the outer shape of the bracket 8. The outer peripheral portion of the back chassis 4 is attached to the rear surface of the attachment portion 8c of the bracket 8.

Various control boards 12, 12, . . . are attached to the rear surface of the back chassis 4 (see FIG. 3). As the control board 12, for example, a power supply board that controls the entire power supply of the display device 1, a backlight board that controls turning on and off the light emitting element 11, a signal processing board that controls images, sounds, and the like, a control board that performs display control of the display 3, and the like are provided.

Upper speakers 13, 13 are attached to the upper end portion of the rear surface of the back chassis 4 so as to be separated horizontally from each other. Note that the number of the upper speakers 13 is arbitrary, and may be one or may be three or more. The upper speaker 13 is, for example, a dynamic speaker, and has a case body 14, sound output units 15, 15, 15, and a metal plate 16.

The upper speakers 13, 13 are arranged at symmetrical positions, for example, with respect to the center line in the left-right direction of the display device 1.

Figure 6:
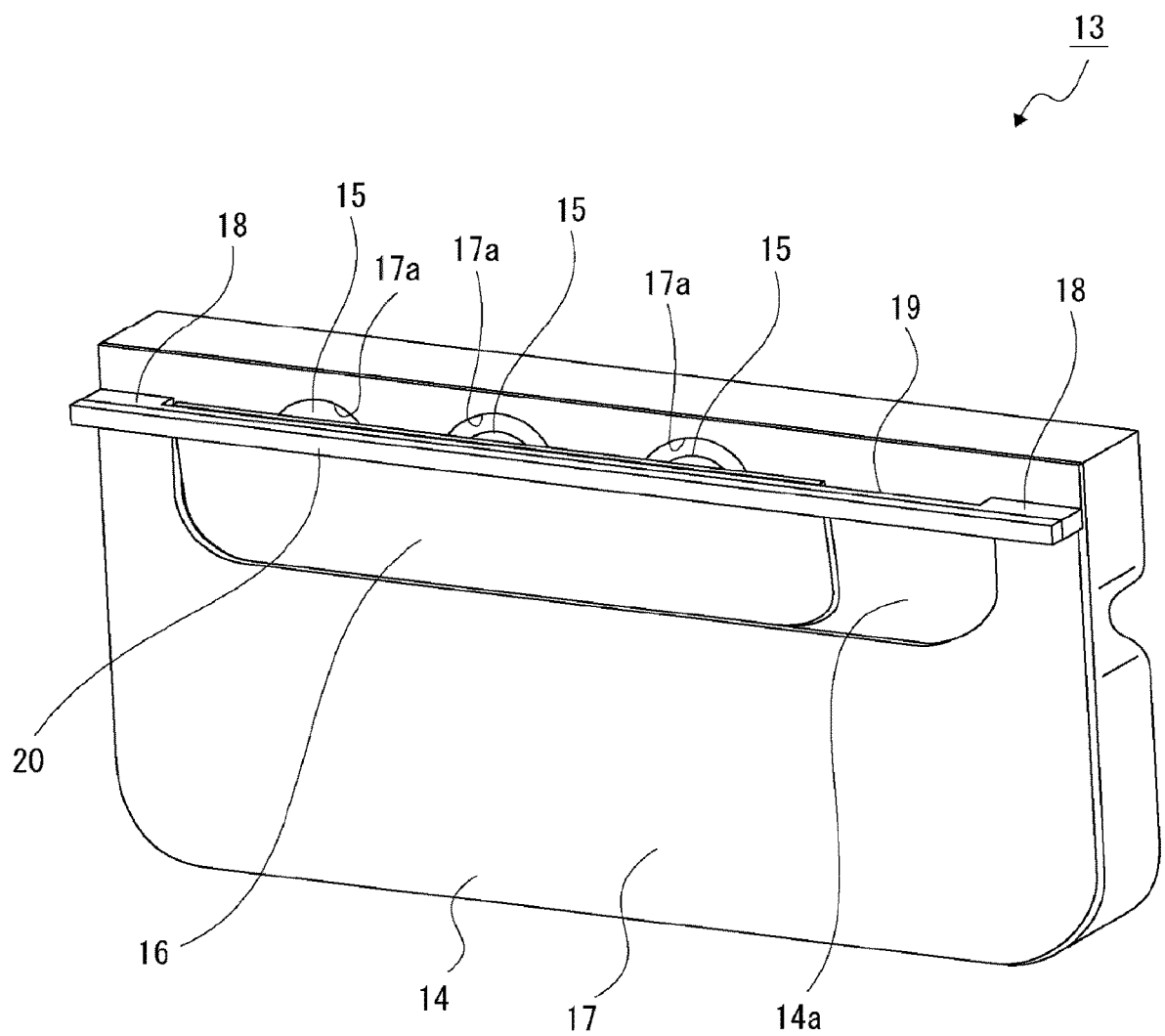
FIG. 6 is a perspective view of a first speaker.

The case body 14 is formed in a horizontally long substantially rectangular shape, the front-rear direction is the thickness direction, and the thickness is smaller than the width of up, down, left, and right (see FIGS. 4 and 6). A shallow recess 14a that opens forward and upward is formed at the upper end portion of the case body 14.

The case body 14 has an internal space formed as an arrangement space, and for example, three arrangement holes 17a, 17a, 17a penetrating front and rear through the front surface portion 17 are formed so as to be separated horizontally from each other. The arrangement holes 17a, 17a, 17a are located at the portion where the recess 14a is formed.

Each of the front end portions of the sound output units 15, 15, 15 is arranged in the arrangement holes 17a, 17a, 17a, respectively, and the parts other than the front end portions of the sound output units 15, 15, 15 are arranged in the arrangement space. The sound output units 15, 15, 15 are speaker units having a diaphragm, a coil bobbin, and the like. In the sound output units 15, 15, 15, for example, one sound output unit 15 is provided as a tweeter having a high-pitched sound reproduction band, and the other two sound output units 15, 15 are provided for the midrange having a midrange sound reproduction band, and the overall upper speaker 13 is, for example, a speaker for the full range that outputs the sound of the high range to the mid-low range.

The case body 14 is provided with protrusions 18, 18 each projecting forward from the front surface portion 17, and a bridge portion 19 coupling the protrusions 18, 18 and extending horizontally. The protrusions 18, 18 project from the left and right end portions of a portion of the front surface portion 17 near the upper end, respectively, and the left and right end portions of the bridge portion 19 are continuous with the front end portions of the protrusions 18, 18. Accordingly, the bridge portion 19 is located on the front side of the recess 14a so as to be separated from the front surface portion 17 in the front-rear direction.

A cushion 20 is bonded to the front surface of the bridge portion 19.

The metal plate 16 is attached to the case body 14 in a state of covering the portion of the recess 14a excluding the upper end portion from the front. The metal plate 16 is inclined upward and diagonally forward in a state where an upper end portion is fixed to the rear surface of the bridge portion 19, a lower end portion is fixed to the lower end portion of the recess 14a in the front surface portion 17, and the upper end is located in front of the lower end. By attaching the metal plate 16 to the case body 14, the portions of the sound output units 15, 15 15 excluding the upper end portions are covered from the front by the metal plate 16.

The upper speaker 13 is attached to the back chassis 4 in a state where the cushion 20 is pressed against the rear surface of the back chassis 4. By attaching the upper speaker 13 to the back chassis 4 via the cushion 20 as described above, the case body 14 is in a state where the sealing performance and the holding performance are effective with respect to the back chassis 4, and a preferable sound characteristic in the upper speaker 13 can be ensured.

Furthermore, the upper speaker 13 is attached to the back chassis 4 in a state where the portion located above the metal plate 16 is located above the bracket 8. Accordingly, a part of the upper speakers 13, 13 is located above the display 3.

Sound is output from the sound output units 15, 15, 15 toward the front, and part of the sound output toward the front is reflected upward by the metal plate 16 arranged in an inclined state and goes forward from upward.

Lower speakers 21, 21 are attached to the lower end portion of the rear surface of the back chassis 4 so as to be separated horizontally from each other (see FIG. 3). Note that the number of the lower speakers 21 is arbitrary, and may be one or may be three or more. The lower speaker 21 is, for example, a dynamic speaker, and has a case body 22, sound output units 23, 23, 23, and a metal plate 24.

The lower speakers 21, 21 are arranged at symmetrical positions, for example, with respect to the center line in the left-right direction of the display device 1, and are located directly below the upper speakers 13, 13, respectively.

Figure 7:
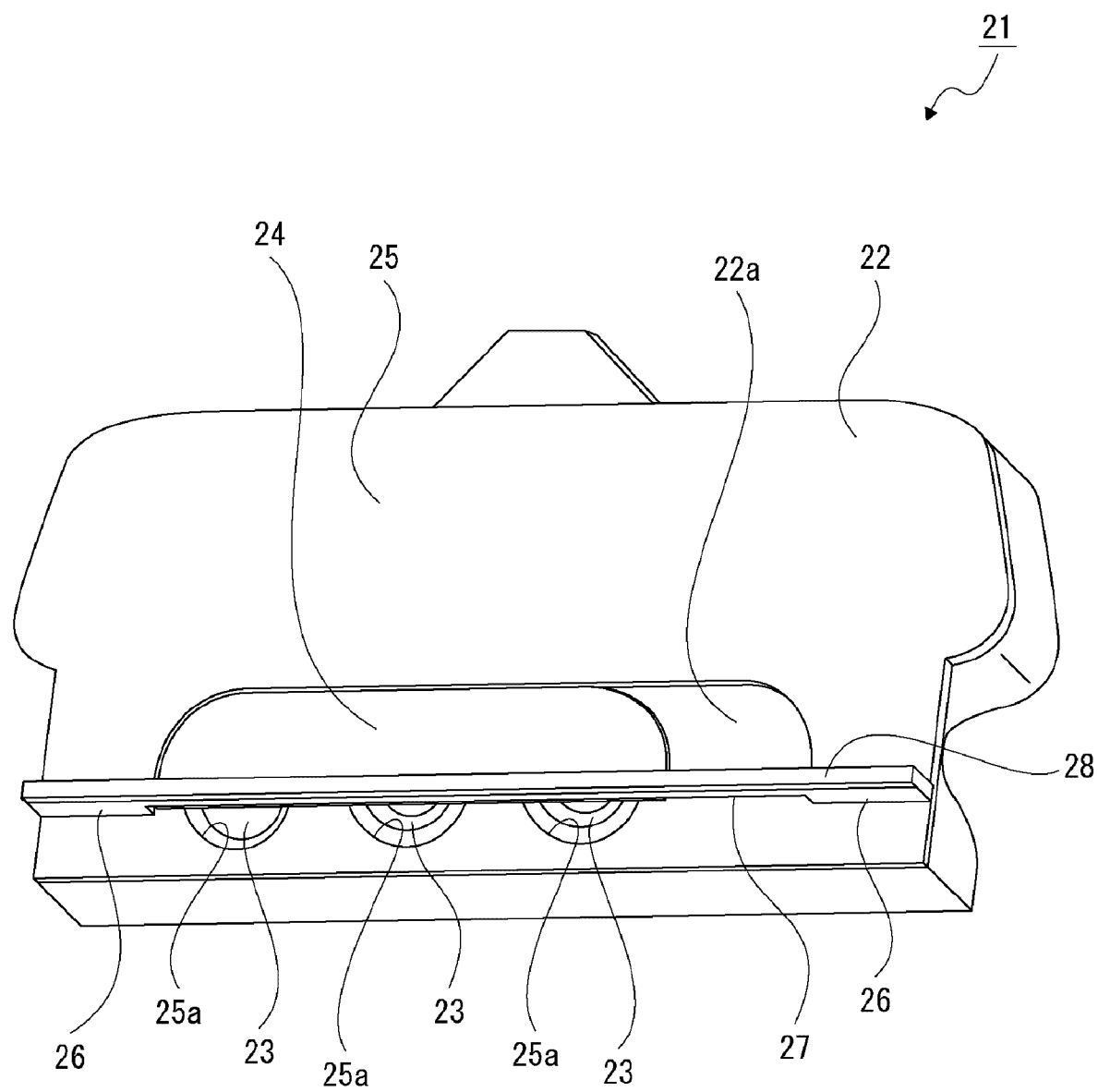
FIG. 7 is a perspective view of a second speaker.

The case body 22 is formed in a horizontally long substantially rectangular shape, the front-rear direction is the thickness direction, and the thickness is smaller than the width of up, down, left, and right (see FIGS. 5 and 7). A shallow recess 22a that opens forward and downward is formed at the lower end portion of the case body 22.

The case body 22 has an internal space formed as an arrangement space, and for example, three arrangement holes 25a, 25a, 25a penetrating rear and front through the front surface portion 25 are formed so as to be separated horizontally from each other. The arrangement holes 25a, 25a, 25a are located at the portion where the recess 22a is formed.

Each of the front end portions of the sound output units 23, 23, 23 is arranged in the arrangement holes 25a, 25a, 25a, respectively, and the parts other than the front end portions of the sound output units 23, 23, 23 are arranged in the arrangement space. The sound output units 23, 23, 23 are speaker units having a diaphragm, a coil bobbin, and the like. For example, one sound output unit 23 is provided as a tweeter having a high-pitched sound reproduction band, the other two sound output units 23, 23 are provided for the midrange having a midrange sound reproduction band, and the overall lower speaker 21 is, for example, a speaker for the full range that outputs the sound of the high range to the mid-low range. However, at least the bass side of the sound output band of the lower speaker 21 is lower than the sound output band of the upper speaker 13.

The case body 22 is provided with protrusions 26, 26 each projecting forward from the front surface portion 25, and a bridge portion 27 connecting the protrusions 26, 26 and extending horizontally. The protrusions 26, 26 projects from the left and right end portions of the front surface portion 25 near the lower end, respectively, and the left and right end portions of the bridge portion 27 are continuous with the front end portions of the protrusions 26, 26. Accordingly, the bridge portion 27 is located on the front side of the recess 22a so as to be separated from the front surface portion 25 in the front-rear direction.

A cushion 28 is bonded to the front surface of the bridge portion 27.

The metal plate 24 is attached to the case body 22 in a state of covering the portion of the recess 22a excluding the lower end portion from the front. The lower end portion of the metal plate 24 is fixed to the rear surface of the bridge portion 27, the upper end portion of the metal plate 24 is fixed to the upper end portion of the recess 22a in the front surface portion 25, and the metal plate 24 is arranged in a vertical state where the upper end and the lower end face in the front-rear direction so that they are in the same position in the front-rear direction. By attaching the metal plate 24 to the case body 22, the portions of the sound output units 23, 23, 23 excluding the lower end portions are covered from the front by the metal plate 24.

The lower speaker 21 is attached to the back chassis 4 with the cushion 28 pressed against the rear surface of the back chassis 4. By attaching the lower speaker 21 to the back chassis 4 via the cushion 28 as described above, the case body 22 is in a state where the sealing performance and the holding performance are effective with respect to the back chassis 4, and a preferable sound characteristic in the lower speaker 21 can be ensured.

Furthermore, the lower speaker 21 is attached to the back chassis 4 in a state where the portion located below the metal plate 24 is located below the bracket 8. Accordingly, a part of the lower speakers 21, 21 are located below the display 3.

Sound is output from the sound output units 23, 23, 23 toward the front, and part of the sound output toward the front is reflected by the metal plate 24 arranged in a vertical state and goes forward from downward.

Bass speakers 29, 29 are attached to a position near the upper end and a position near the lower end position on the rear surface of the back chassis 4, respectively, so as to be separated vertically from each other (see FIG. 3). Note that the number of the bass speakers 29 is arbitrary, and may be one or may be three or more. The bass speaker 29 is, for example, a dynamic speaker. The bass speakers 29, 29 are arranged in the center of the display device 1 in the left-right direction, are located between the upper speakers 13, 13 and the lower speakers 21, 21 in the vertical direction, and located between the upper speakers 13, 13 and the lower speakers 21, 21 in the left-right direction.

The bass speaker 29 is provided, for example, as a woofer set having a bass sound reproduction band, and the reproduction band is lower than that of the upper speaker 13 and the lower speaker 21. The bass speaker 29 is provided with, for example, two sound output units 29a, 29a, and the bass speaker 29 is attached to the back chassis 4, for example, with the sound output units 29a, 29a arranged side by side.

The bass speaker 29 is attached to the back chassis 4 with a cushion (not shown) pressed against the rear surface of the back chassis 4, and a preferable acoustic characteristic is ensured. Sound is output from the bass speakers 29, 29 toward the rear, and the sound output toward the rear mainly goes around the upper or lower part of the display 3 and goes forward.

As described above, two upper speakers 13 and two lower speakers 21 are provided, the sound of the right channel is output from one upper speaker 13 and one lower speaker 21, and the sound of the left channel is output from the other upper speaker 13 and the other lower speaker 21, and the stereo mode sound output is performed by the right sound and the left sound. However, monaural mode sound output may be performed from the upper speakers 13, 13 and the lower speakers 21, 21.

On the other hand, the same monaural sound is output from the bass speakers 29, 29. However, the sound of the right channel and the sound of the left channel may be output from the bass speakers 29, 29, respectively, and the stereo mode sound output may be performed.

Note that, since the same monaural sound is output from the bass speakers 29, 29, it is desirable that the bass speakers 29, 29 are arranged as close as possible. However, since the sound output from the bass speakers 29, 29 each mainly goes so as to wrap around the upper and lower sides of the display 3 and goes forward, it is desirable to arrange the bass speakers 29, 29 on the upper end side or the lower end side as much as possible in consideration of wraparound ease.

Therefore, as described above, by attaching and arranging the bass speakers 29, 29 to and in the position near the upper end and the position near the lower end of the back chassis 4, respectively, it is possible to make the same monaural sound easy to be heard, and make the sound output from the bass speakers 29, 29 easy to wrap around from the upper side and the lower side of the display 3, respectively, so that a preferable output state of the sound to the front can be ensured.

The outer frame 5 is configured by coupling an upper portion 30, a lower portion 31, and side portions 32, 32 in a frame shape, and is arranged so as to cover the display 3 and the back chassis 4 from the outer peripheral side (see FIGS. 1 to 5). The upper portion 30 and the lower portion 31 are each formed in a shape extending horizontally, and the side portions 32, 32 are formed in a shape extending vertically.

Figure 8:
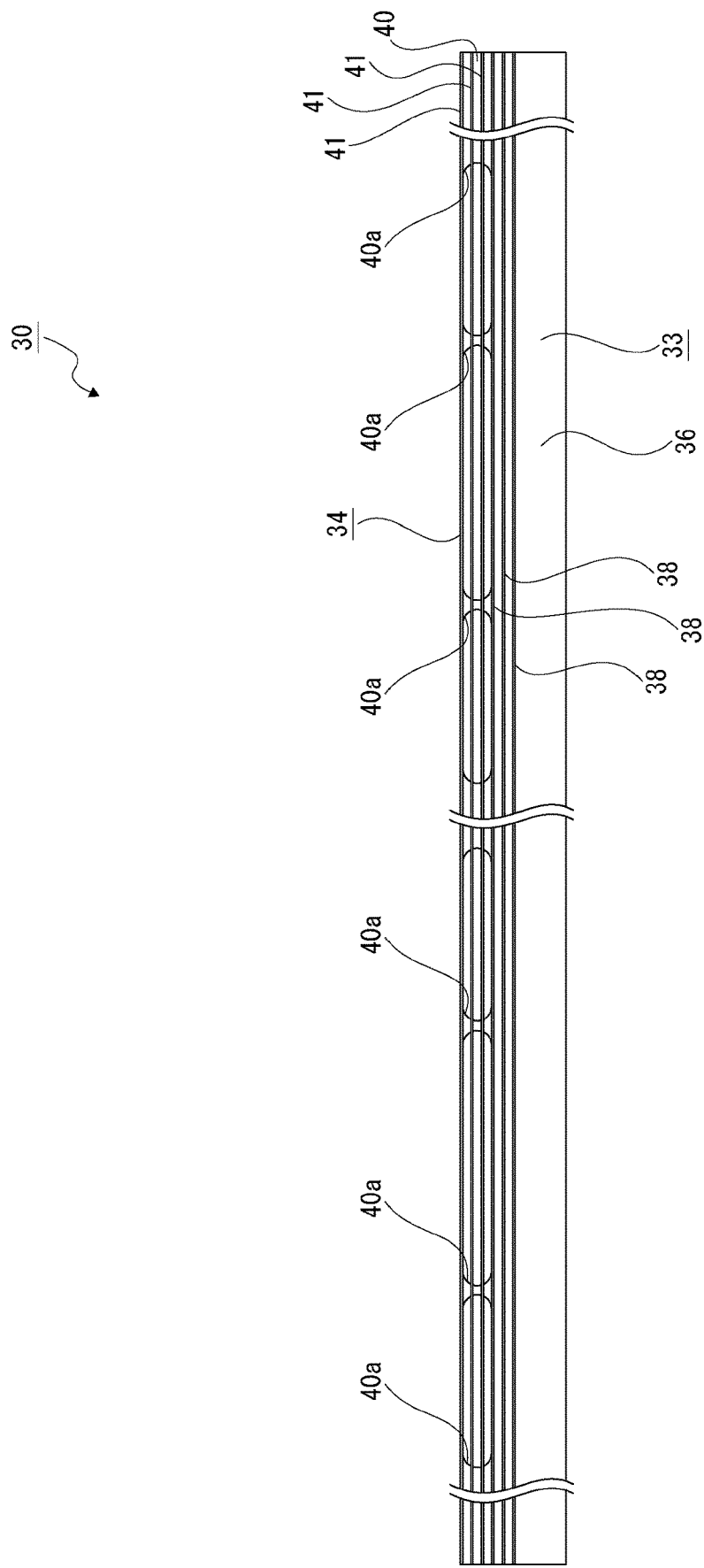
FIG. 8 is a front view illustrating an upper part of an outer frame.
Figure 9:
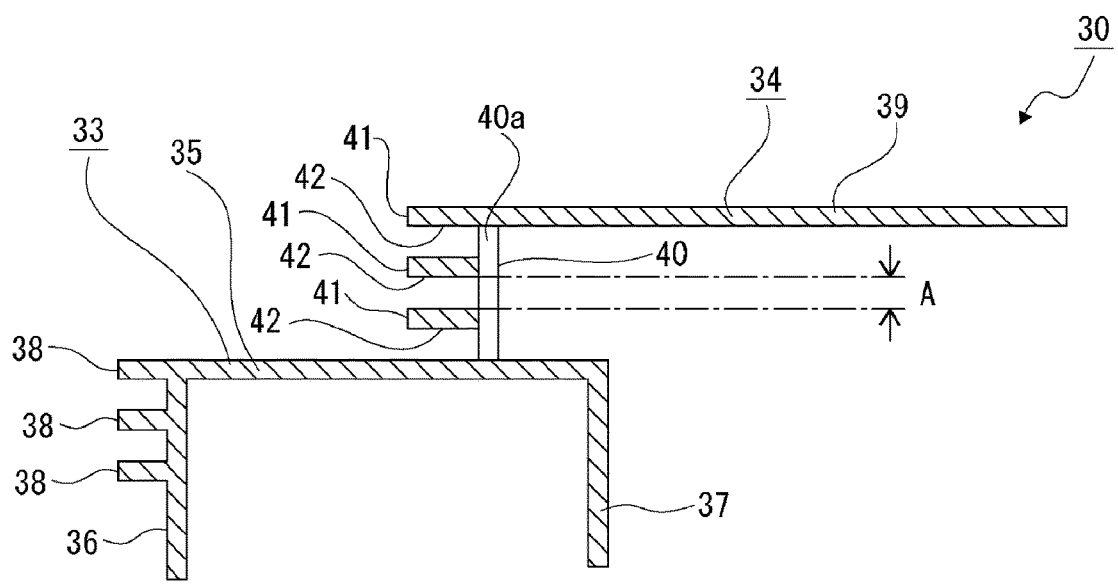
FIG. 9 is a cross-sectional view illustrating the upper part of the outer frame.

The upper portion 30 includes a first portion 33 located on a lower side and a second portion 34 located on an upper side of the first portion 33, which are integrally formed including a metal material such as aluminum, for example (see FIGS. 8 and 9).

The first portion 33 has: a top plate portion 35 facing in the vertical direction; a front plate portion 36 projecting downward from the front end portion of the top plate portion 35 and facing the front-rear direction; a rear plate portion 37 projecting downward from the rear end portion of the top plate portion 35 and facing in the front-rear direction; and eaves 38, 38, 38 each projecting forward from the front plate portion 36. The eaves 38, 38, 38 are vertically separated from each other, and the uppermost eaves 38 project forward from the upper end portion of the front plate portion 36.

The second portion 34 has: an upper surface portion 39 facing in the vertical direction; a front surface portion 40 projecting downward from the front end portion of the upper surface portion 39 and facing in the front-rear direction; and fins 41, 41, 41 each projecting forward from the front surface portion 40. The lower end portion of the front surface portion 40 is continuous with the portion of the top plate portion 35 near the rear end. For example, three fins 41, 41, 41 are provided, the distance between the fins 41, 41, 41 is the same, and the distance between the fin 41 located at the lowermost side and the top plate portion 35 is also the same as the distance between the fins 41, 41, 41.

Sound passage holes 40a, 40a, . . . penetrating in the front and rear are formed in the front surface portion 40. Three sound passage holes 40a are formed side by side on the front side of the upper speakers 13, 13. The sound passage hole 40a is located between the upper surface portion 39 and the top plate portion 35. The space on the front side of the sound passage hole 40a is divided into three parts in the vertical direction by fins 41, 41, 41 and the top plate portion 35, and these three divided parts are formed as upper slits 42, 42, 42.

Figure 10:
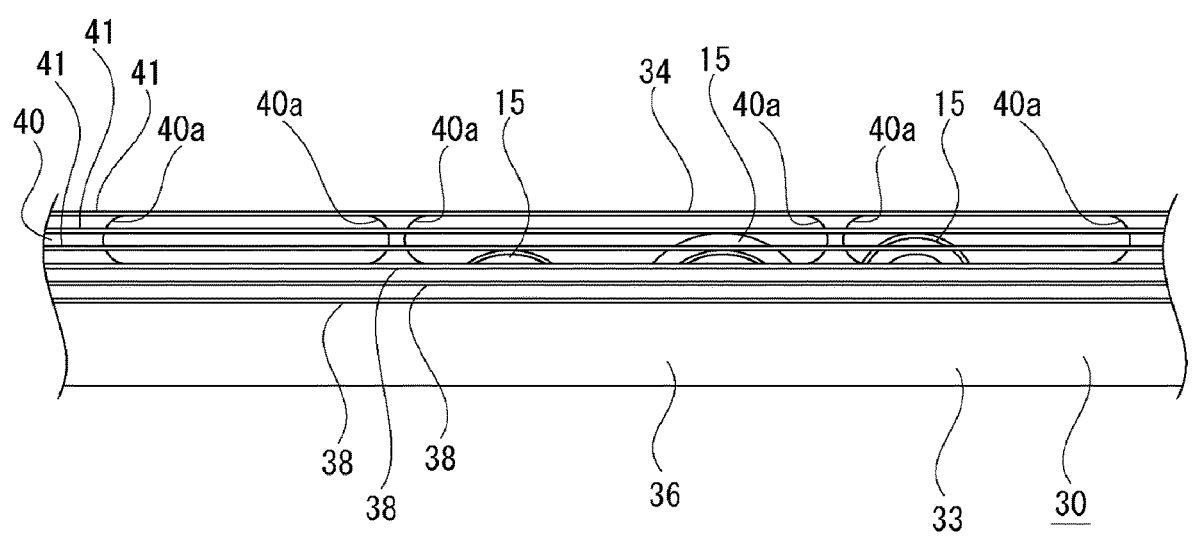
FIG. 10 is a front view illustrating a positional relationship between the upper part of the outer frame and an upper speaker.

The upper portion 30 is arranged so that the front plate portion 36 covers the outer peripheral portion of the display 3 from the front and the top plate portion 35 covers the holder 7 and the bracket 8 from above, and the rear plate portion 37 is, for example, attached to the attachment portion 8c of the bracket 8 (see FIG. 4). The upper speakers 13, 13 attached to the rear surface of the back chassis 4 are covered from above by the upper surface portion 39, and the sound passage holes 40a and the upper slits 42, 42, 42 are located on the front side of the upper end portions of the sound output units 15, 15, 15 in the upper speaker 13 (see FIGS. 4 and 10).

Therefore, the sound output from the sound output units 15, 15, 15 toward the front is reflected upward by the metal plate 16 arranged in an inclined state and goes to the front from upward, or the passes through the upper side of the metal plate 16, goes forward, passes through the sound passage holes 40a and the upper slits 42, 42, 42, wraps around the upper side of the display 3, and is emitted forward (see arrow P in FIG. 4).

Figure 11:
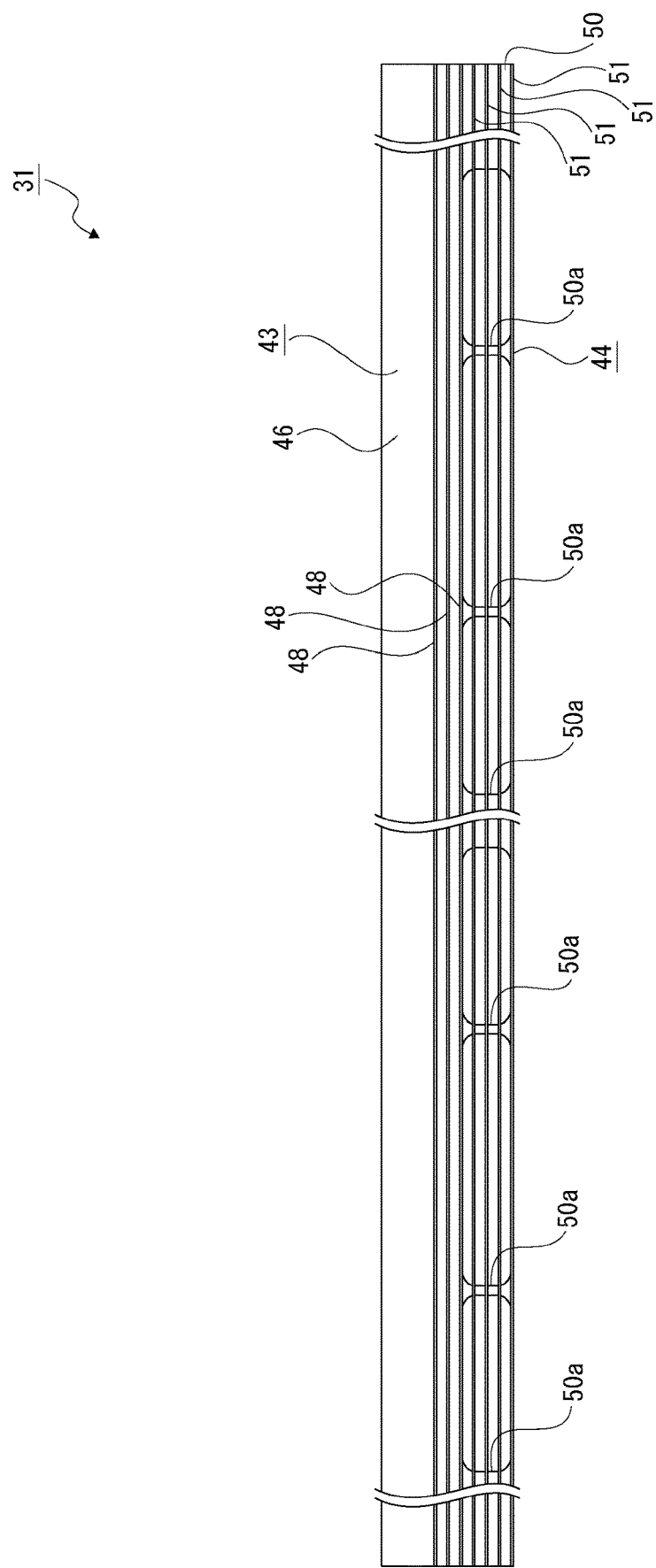
FIG. 11 is a front view illustrating a lower part of the outer frame.
Figure 12:
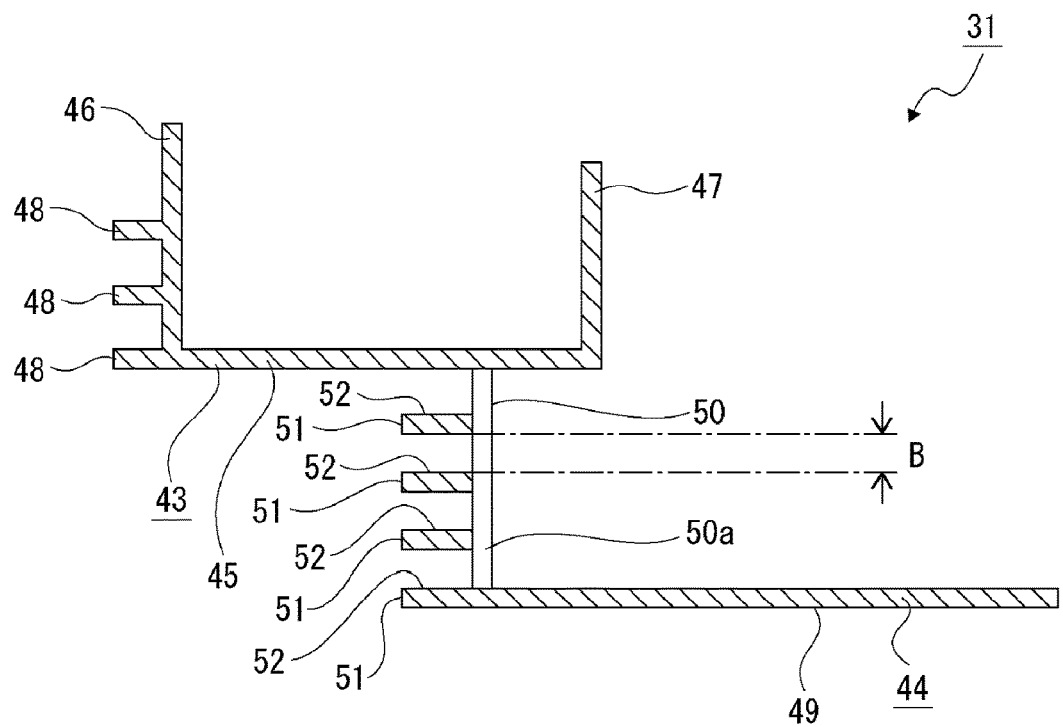
FIG. 12 is a cross-sectional view illustrating the lower part of the outer frame.
Figure 13:
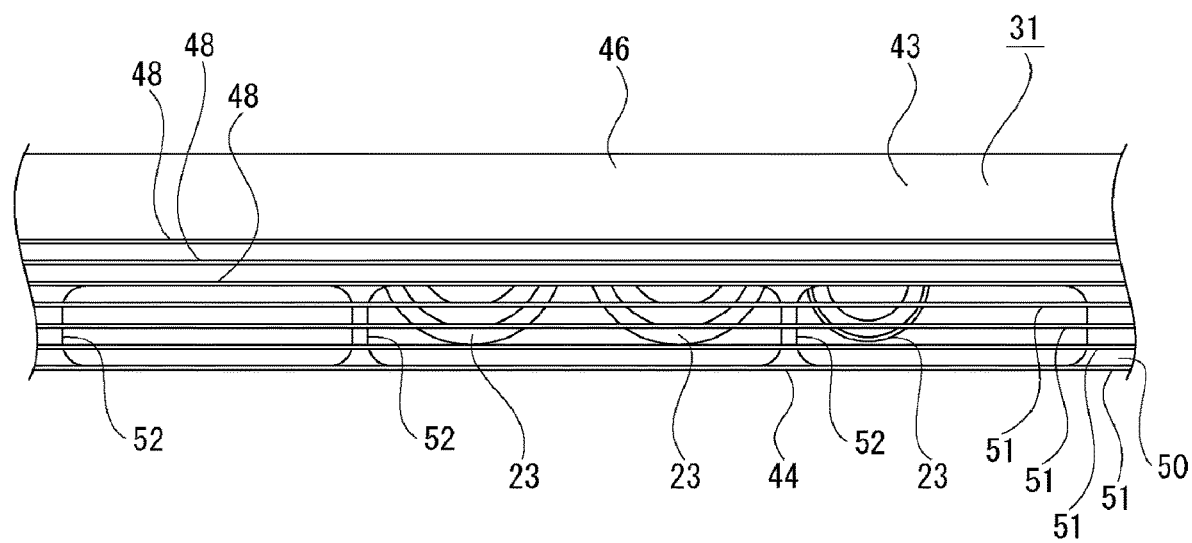
FIG. 13 is a front view illustrating a positional relationship between the lower part of the outer frame and a lower speaker.

The lower portion 31 includes a first portion 43 located on an upper side and a second portion 44 located on a lower side of the first portion 43, which are integrally formed including a metal material such as aluminum, for example (see FIGS. 11 and 12).

The first portion 43 has: a bottom plate portion 45 facing in the vertical direction; a front plate portion 46 projecting upward from the front end portion of the bottom plate portion 45 and facing the front-rear direction; a rear plate portion 47 projecting upward from the rear end portion of the bottom plate portion 45 and facing in the front-rear direction; and eaves 48, 48, 48 each projecting forward from the front plate portion 46. The eaves 48, 48, 48 are vertically separated from each other, and the lowermost eaves 48 project forward from the lower end portion of the front plate portion 46.

The second portion 44 has: a lower surface portion 49 facing in the vertical direction; a front surface portion 50 projecting upward from the front end portion of the lower surface portion 49 and facing in the front-rear direction; and fins 51, 51, . . . each projecting forward from the front surface portion 50. The upper end portion of the front surface portion 50 is continuous with the portion of the bottom plate portion 45 near the rear end. For example, three fins 51, 51, . . . are provided, the distance between the fins 51, 51, . . . is the same, and the distance between the fin 51 located at the uppermost side and the bottom plate portion 45 is also the same as the distance between the fins 51, 51, . . . .

Sound passage holes 50a, 50a, . . . penetrating in the front and rear are formed in the front surface portion 50. Three sound passage holes 50a are formed side by side on the front side of the lower speakers 21, 21. The sound passage hole 50a is located between the lower surface portion 49 and the bottom plate portion 45. The space on the front side of the sound passage hole 50a is divided into four parts in the vertical direction by fins 51, 51, . . . and the bottom plate portion 45, and these four divided parts are formed as lower slits 52, 52, . . . .

The lower portion 31 is arranged so that the front plate portion 46 covers the outer peripheral portion of the display 3 from the front and the bottom plate portion 45 covers the holder 7 and the bracket 8 from below, and the rear plate portion 47 is, for example, attached to the attachment portion 8c of the bracket 8 (see FIG. 5). The lower speakers 21, 21 attached to the rear surface of the back chassis 4 are covered from below by lower surface portion 49, and the lower slits 52, 52, . . . are located on the front side of the lower end portions of the sound output units 23, 23, 23 in the lower speaker 21 (see FIGS. 5 and 11).

Therefore, the sound output from the sound output units 23, 23, 23 toward the front is reflected by the metal plate 24 and goes to the front from downward, or the passes through the lower side of the metal plate 24, goes forward, passes through the sound passage holes 50a and the lower slits 52, 52, . . . , wraps around the lower side of the display 3, and is emitted forward (see arrow Q in FIG. 5).

In the upper speaker 13 and the lower speaker 21 described above, a vertical width B of the lower slit 52 in the lower speaker 21 is larger than a vertical width A of the upper slit 42 in the upper speaker 13 (see FIGS. 9 and 12). Furthermore, four lower slits 52 are formed and three upper slits 42 are formed, and the number of lower slits 52 is larger than the number of upper slits 42.

Note that the number of the upper slits 42 and the number of the lower slits 52 are arbitrary as long as at least one of each is formed, and it is desirable that the number of the lower slits 52 is larger than the number of the upper slits 42.

As described above, in the display device 1, the sound output from the upper speaker 13 passes through the upper slit 42 located above the display 3, and the sound output from the lower speaker 21 passes through the lower slit 52 that is located below the display 3 and has the vertical width B larger than the vertical width A of the upper slit 42.

Accordingly, the sound output from the lower speaker 21 passes through the lower slit 52 whose vertical width B is larger than the vertical width A in the upper slit 42 and is emitted forward, so that a stable sound output state from a low position is ensured. Furthermore, the sound output from the upper speaker 13 passes through the upper slit 42 from the upper side and is emitted toward the front, and the sound output from the lower speaker 21 passes through the lower slit 52 from the lower side and is emitted toward the front, so that a sound image is easily localized in the center of the display 3, a user recognizes as if the sound is output from the center of the display 3 that the user is viewing, and the user (viewer) can view the image or video and the sound while recognizing the sense of unity between the image or video and the sound.

Figure 2:
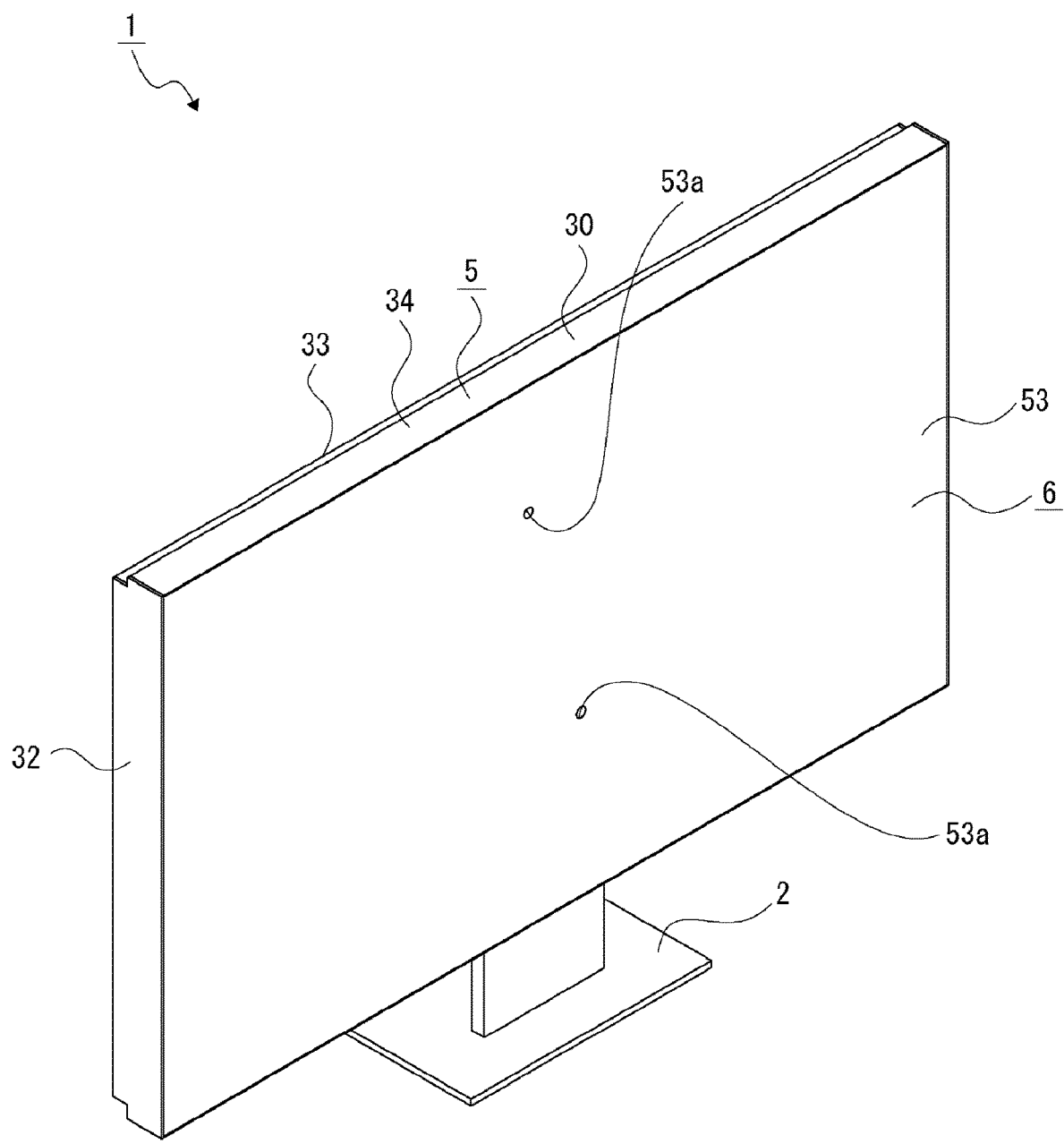
FIG. 2 is a perspective view illustrating a back surface side of the display device.

Sides 32, 32 are located horizontally in the display 3, back chassis 4, and the like, the upper end portion is coupled to the left and right end portions of the upper portion 30, and the lower end portion is coupled to the left and right end portions of the lower portion 31 (see FIGS. 1 to 3).

The rear cover 6 has: a flat plate-shaped closed surface portion 53 that faces substantially in the front-rear direction; and a frame-shaped coupling portion 54 that projects forward from the outer peripheral portion of the closed surface portion 53 (see FIGS. 2, 4, and 5). Sound output holes 53a, 53a are formed in the closed surface portion 53 so as to be separated from each other.

In the rear cover 6, the coupling portion 54 is coupled to the inner peripheral surface of the rear end portion of the outer frame 5. Accordingly, each part such as the control boards 12, 12, . . . , the upper speakers 13, 13, the lower speakers 21, 21, and the bass speakers 29, 29 attached to the back chassis 4 is covered from the rear by the rear cover 6.

When the rear cover 6 is coupled to the outer frame 5, the sound output holes 53a, 53a of the closed surface portion 53 are located directly behind the bass speakers 29, 29, respectively. Accordingly, the sound output from the bass speakers 29, 29 toward the rear passes through the sound output holes 53a, 53a, mainly goes upward and downward, wraps around the upper and lower sides of the display 3, and is emitted forward.

CONCLUSION

As described above, the display device 1 includes: the upper speaker 13 and the lower speaker 21 arranged between the display 3 and the rear cover 6 and located so as to be separated vertically from each other, in which the upper slit 42 functioning as a passage hole for sound output from the upper speaker 13 is located above the display 3, the lower slit 52 functioning as a passage hole for sound output from the lower speaker 21 is located below the display 3, and the vertical width B of the lower slit 52 is larger than the vertical width A of the upper slit 42.

Accordingly, the sound output from the upper speaker 13 passes through the upper slit 42 located above the display 3, and the sound output from the lower speaker 21 passes through the lower slit 52 that is located below the display 3 and has the vertical width A larger than the vertical width B of the upper slit 42. Therefore, the sound image is localized in the center of the display 3 while the stable sound output state from the low position is ensured, and preferable viewing state where the image or video and the sound are united can be ensured.

Furthermore, since a user recognizes as if the sound is being output from the display 3 that the user is viewing, it is possible to enhance the sound image localization effect and ensure a preferable viewing state in which a sense of unity between the image or video and the sound is generated.

In particular, the sound output from the upper speaker 13 that wraps around the display 3 and the sound output from the lower speaker 21 that wraps around the display 3 are easier to be recognized by the user as if being output from the center of the display 3 that the user is viewing, and a realistic viewing state can be ensured by a sense of unity between the image or video and the sound.

Furthermore, the number of lower slits 52, 52, . . . is larger than the number of upper slits 42, 42, 42.

Accordingly, it is possible to make the opening area of the lower slits 52, 52, . . . larger than that of the upper slits 42, 42, 42 without changing the vertical widths of the upper slits 42, 42, 42 and the lower slits 52, 52, . . . , ensure a stable sound output state from a low position, and ensure a preferable viewing state for a user.

In particular, by making the total opening area of the lower slits 52, 52, . . . larger than the total opening area of the upper slits 42, 42, 42, it is possible to emit the sound output from the lower speaker 21 from the lower slit 52, 52, . . . at a high sound pressure, and ensure a stable output state of sound from a low position.

Moreover, the upper slit 42 and the lower slit 52 are formed on the outer frame 5 that covers the display 3 from the outer peripheral side.

Accordingly, since the display 3 is covered from the outer peripheral side by the outer frame 5 and the sound is output from the upper slit 42 and the lower slit 52, which are the spaces formed in the outer frame 5, it is not necessary to provide a dedicated member to form the upper slit 42 and the lower slit 52, and the structure can be simplified by reducing the number of parts.

Furthermore, two upper speakers 13 and two lower speakers 21 are arranged so as to be separated from each other horizontally.

Accordingly, since the sound is output from each of the upper speakers 13, 13 and the lower speakers 21, 21 located vertically and horizontally, it is possible to ensure a stable sound output state from a high position and a low position, and ensure a preferable viewing state for a user. Furthermore, it is possible to output stereo sound, and ensure a realistic viewing state for a user.

Furthermore, at least a part of the upper speakers 13, 13 is arranged on the back surface side at an upper end portion of the display 3, and at least a part of the lower speakers 21, 21 is arranged on the back surface side at a lower end portion of the display 3.

Accordingly, since the positions of the upper speakers 13, 13 with respect to the upper slits 42, 42, 42 are closer, and the positions of the lower speakers 21, 21 with respect to the lower slits 52, 52, . . . are closer, interference of sound output from the upper speakers 13, 13 and sound output from the lower speakers 21, 21 with other parts is unlikely to occur, and a stable sound output state can be ensured.

Moreover, a part of the upper speakers 13, 13 is located above the display 3.

Accordingly, since the entire upper speakers 13, 13 are not located above the display 3, it is possible to reduce the size of the display device 1 in the vertical direction while ensuring a preferable sound output state from the upper speakers 13, 13.

Furthermore, the upper speaker 13 includes the sound output units 15, 15, 15 that output sound, and the metal plate 16 that faces the sound output units 15, 15, 15 in an output direction of sound from the sound output units 15, 15, 15, and is located below the upper slit 42.

Accordingly, since at least part of the sound output from the upper speaker 13 goes to the metal plate 16, the sound output from the upper speaker 13 is hard to be absorbed, and a preferable sound output state from the upper speaker 13 can be ensured.

Furthermore, the metal plate 16 of the upper speaker 13 is inclined upward and diagonally forward.

Accordingly, since part of the sound output from the upper speaker 13 is guided toward the upper slit 42 by the metal plate 16, a preferable sound output state from the upper speaker 13 can be ensured while the sound absorption is suppressed.

Moreover, a part of the lower speakers 21, 21 is located below the display 3.

Accordingly, since the entire lower speakers 21, 21 are not located below the display 3, it is possible to reduce the size of the display device 1 in the vertical direction while ensuring a preferable sound output state from the lower speakers 21, 21.

Furthermore, the lower speaker 21 includes the sound output units 23, 23, 23 that output sound, and the metal plate 24 that faces the sound output units 23, 23, 23 in an output direction of sound from the sound output units 23, 23, 23, and is located above the lower slit 52.

Accordingly, since at least part of the sound output from the lower speaker 21 goes to the metal plate 24, the sound output from the lower speaker 21 is hard to be absorbed, and a preferable sound output state from the lower speaker 21 can be ensured.

Note that, although the example in which the metal plate 24 of the lower speaker 21 is arranged in a vertical state is shown above, the metal plate 24 may be in a state of being inclined diagonally forward downward.

When the metal plate 24 is inclined diagonally forward downward, since part of the sound output from the lower speaker 21 is guided toward the lower slit 52 by the metal plate 24, a preferable sound output state from the lower speaker 21 can be ensured while the sound absorption is suppressed.

Furthermore, the bass speaker 29 having the lower sound output band than the upper speaker 13 and the lower speaker 21 is arranged between the display 3 and the rear cover 6, and the bass speaker 29 is located between the upper speaker 13 and the lower speaker 21 in the vertical direction.

Accordingly, since the sound output from the bass speaker 29 is output from between the upper speaker 13 and the lower speaker 21 in the vertical direction, the sound output from the bass speaker 29 wraps around the back surface side of the display 3, is transmitted to the display surface 3a side of the display 3, and is output from the upper speaker 13, the lower speaker 21, and the bass speaker 29 in a preferable balance, so that it is possible to ensure a realistic viewing state for a user.

Moreover, two upper speakers 13 and two lower speakers 21 are arranged so as to be separated from each other horizontally, and two bass speakers 29 are arranged so as to be separated vertically from each other.

Accordingly, the sound output from the two bass speakers 29, 29 each wraps around the back surface side of the display 3 from upward and downward and is easily transmitted to the display surface 3a side of the display 3, and sound is output from the two upper speakers 13, 13, the two lower speakers 21, 21, and the bass speakers 29, 29 in a preferable balance, so that it is possible to ensure a further realistic viewing state for a user.

<Others>

Figure 14:
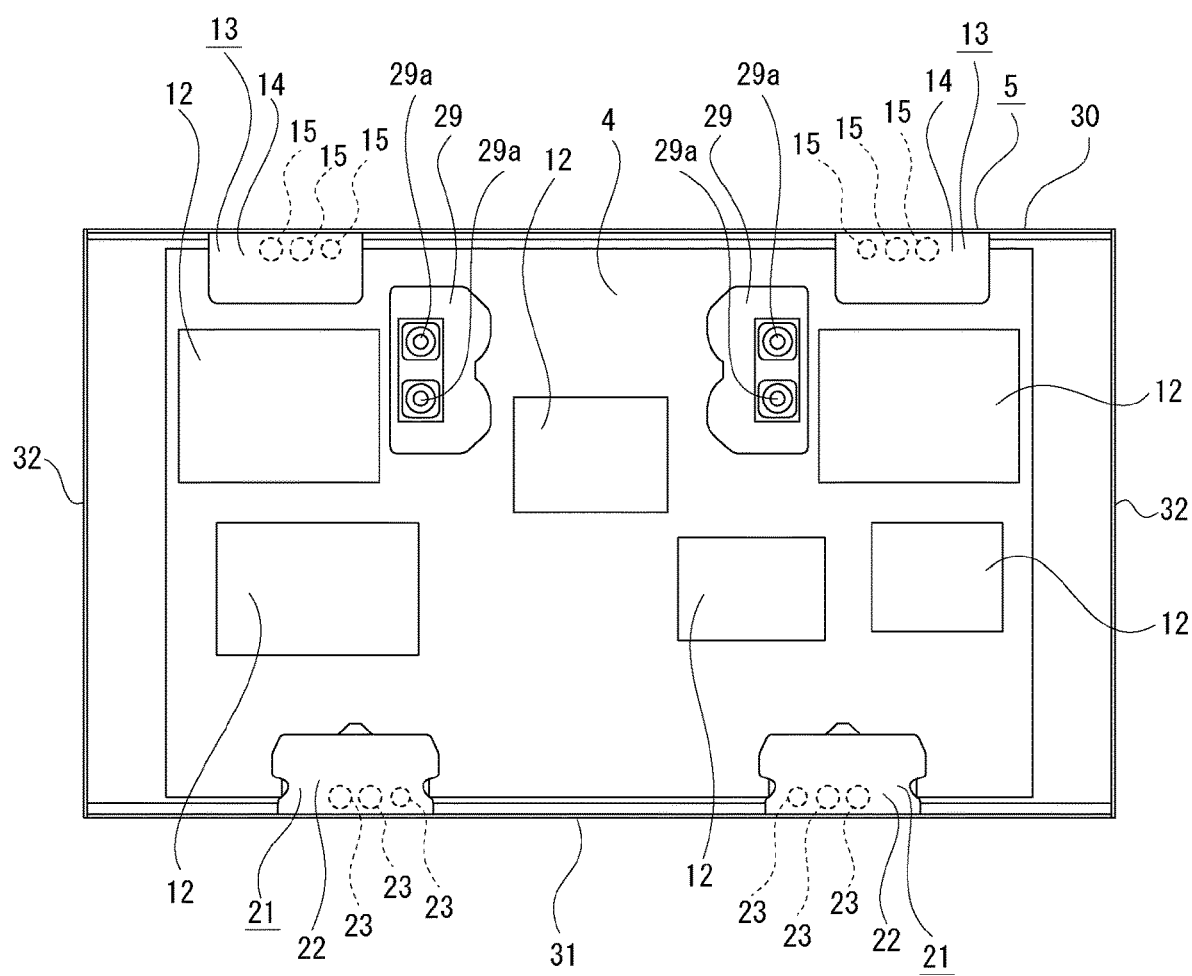
FIG. 14 is a rear view illustrating another arrangement of bass speakers.

The above shows an example in which the sound output units 29a, 29a of the bass speaker 29 are arranged side by side. However, the bass speaker 29 may be attached to the back chassis 4 in a state where the sound output units 29a, 29a are arranged vertically, for example (see FIG. 14). In this case, the two bass speakers 29, 29 may be attached to the upper end side of the back chassis 4 so as to be separated horizontally from each other, and may be attached to the lower end side of the back chassis 4 or at the center in the vertical direction so as to be separated horizontally from each other.

As described above, the sound output units 29a, 29a of the bass speaker 29 are located side by side vertically or horizontally, or the base speakers 29, 29 are located side by side horizontally, so that it is possible to effectively utilize the space according to the position with other members such as the control boards 12, 12, . . . attached to the back chassis 4, improve the degree of freedom in designing the display device 1, and reduce the size.

Figure 15:
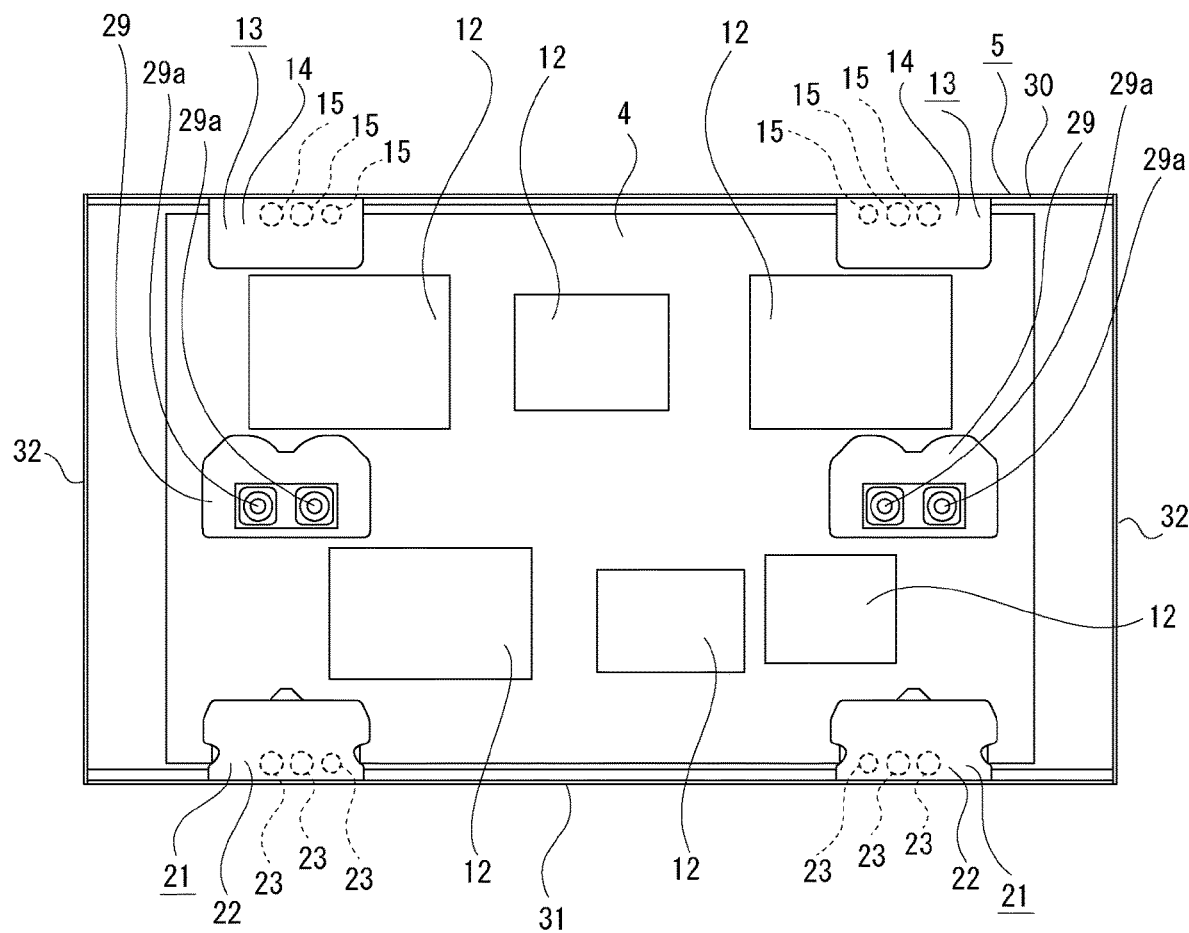
FIG. 15 is a rear view illustrating another arrangement of the bass speakers.

Furthermore, the bass speakers 29, 29 each may be located between the upper speakers 13, 13 and the lower speakers 21, 21 in the vertical direction (see FIG. 15).

In such an arrangement state, the right channel sound is output from one of the left and right upper speakers 13, one of the bass speakers 29, and one of the left and right lower speakers 21, the left channel sound is output from the other one of the upper speakers 13, the other one of the bass speakers 29, and the other one of the lower speakers 21, and it is possible to achieve stereo mode sound output.

Accordingly, the sense of unity of the sound of each channel is enhanced, and it is possible to ensure a preferable sound output state in the stereo mode and ensure a realistic viewing state for a user.

<Present Technology>

The present technology can adopt the following configuration.

(1)

A display device including:
  a display on which an image is displayed on a display surface;
  a rear cover arranged on a back surface side of the display; and
  an upper speaker and a lower speaker arranged between the display and the rear cover and located so as to be separated vertically from each other,
  in which an upper slit functioning as a passage hole for sound output from the upper speaker is located above the display,
  a lower slit functioning as a passage hole for sound output from the lower speaker is located below the display, and
  a vertical width of the lower slit is larger than a vertical width of the upper slit.

(2)

The display device according to (1) above,
  in which a plurality of at least one of the upper slit or the lower slit is formed so as to be separated vertically from each other, and
  a number of the lower slit is larger than a number of the upper slit.

(3)

The display device according to (1) or (2) above,
  in which an outer frame that covers the display from an outer peripheral side is provided, and
  the upper slit and the lower slit are formed in the outer frame.

(4)

The display device according to any one of (1) to (3) above,
  in which two of the upper speakers and two of the lower speakers are arranged so as to be separated horizontally from each other.

(5)

The display device according to any one of (1) to (4) above,
in which at least a part of the upper speaker is arranged on the back surface side at an upper end portion of the display, and
at least a part of the lower speaker is arranged on the back surface side at a lower end portion of the display.

(6)

The display device according to any one of (1) to (5) above,
in which a part of the upper speaker is located above the display.

(7)

The display device according to (6) above,
in which the upper speaker includes a sound output unit that outputs sound, and a metal plate that faces the sound output unit in an output direction of sound from the sound output unit, and is located below the upper slit.

(8)

The display device according to (7) above,
in which the metal plate of the upper speaker is inclined upward and diagonally forward.

(9)

The display device according to any one of (1) to (8) above,
in which a part of the lower speaker is located below the display.

(10)

The display device according to (9) above,
in which the lower speaker includes a sound output unit that outputs sound, and a metal plate that faces the sound output unit in an output direction of sound from the sound output unit, and is located above the lower slit.

(11)

The display device according to (10) above,
in which the metal plate of the lower speaker is inclined downward and diagonally forward.

(12)

The display device according to any one of (1) to (11) above,
in which a bass speaker having a sound output band lower than that of the upper speaker and the lower speaker is arranged between the display and the rear cover, and
the bass speaker is located between the upper speaker and the lower speaker in a vertical direction.

(13)

The display device according to (12) above,
in which two of the upper speakers and two of the lower speakers are arranged so as to be separated horizontally from each other, and
two of the bass speakers are arranged so as to be separated vertically from each other.

(14)

The display device according to (12) above,
in which two of the upper speakers and two of the lower speakers are arranged so as to be separated horizontally from each other,
two of the bass speakers are arranged, and
each of the two of the bass speakers is located between the upper speaker and the lower speaker.

REFERENCE SIGNS LIST

1 Display device
3 Display
3a Display surface
5 Outer frame
6 Rear cover
13 Upper speaker
15 Sound output unit
16 Metal plate
21 Lower speaker
23 Sound output unit
24 Metal plate
29 Bass speaker
42 Upper slit
52a Lower slit

The invention claimed is:

1. A display device, comprising:
a display screen configured to display an image;
a rear cover on a back surface side of the display screen; and
a first upper speaker between the display screen and the rear cover;
a second upper speaker between the display screen and the rear cover;
a first lower speaker between the display screen and the rear cover, wherein the first lower speaker is spaced apart from each of the first upper speaker and the second upper speaker in a vertical direction;
a first bass speaker that has a sound output band lower than that of each of the first upper speaker and the first lower speaker, wherein
the first bass speaker is between the display screen and the rear cover,
the first bass speaker is between the first upper speaker and the first lower speaker in the vertical direction, and
the first bass speaker is between the first upper speaker and the second upper speaker in a horizontal direction;
a first upper slit above the display screen, wherein the first upper slit is a passage hole for first sound output from the first upper speaker; and
a first lower slit below the display screen, wherein
the first lower slit is a passage hole for second sound output from the first lower speaker, and
the first lower slit has a vertical width larger than a vertical width of the first upper slit.

2. The display device according to claim 1, further comprising at least one of a plurality of upper slits or a plurality of lower slits, wherein
the plurality of upper slits includes the first upper slit and a second upper slit,
the second upper slit is spaced apart from the first upper slit in the vertical direction,
the plurality of lower slits includes the first lower slit and a second lower slit,
the second lower slit is spaced apart from the first lower slit in the vertical direction, and
a number of the plurality of lower slits is larger than a number of the plurality of upper slits.

3. The display device according to claim 1, further comprising an outer frame that covers the display screen from an outer peripheral side of the display screen, wherein the outer frame includes the first upper slit and the first lower slit.

4. The display device according to claim 1, further comprising a second lower speaker, wherein
the first upper speaker is spaced apart from the second upper speaker in the horizontal direction, and
the first lower speaker is spaced apart from the second lower speaker in the horizontal direction.

5. The display device according to claim 1, wherein
at least a part of the first upper speaker is on the back surface side at an upper end portion of the display screen, and
at least a part of the first lower speaker is on the back surface side at a lower end portion of the display screen.

6. The display device according to claim 1, wherein a part of the first upper speaker is above the display screen.

7. The display device according to claim 6, further comprising a metal plate below the first upper slit, wherein
the first upper speaker includes a sound output unit, wherein the sound output unit is configured to output the first sound, and
the metal plate is opposite to the sound output unit in an output direction of the first sound from the sound output unit.

8. The display device according to claim 7, wherein the metal plate of the first upper speaker is inclined upward and diagonally forward with respect to the first upper speaker.

9. The display device according to claim 1, wherein a part of the first lower speaker is below the display screen.

10. The display device according to claim 9, further comprising a metal plate above the first lower slit, wherein
the first lower speaker includes a sound output unit, wherein the sound output unit is configured to output the second sound, and
the metal plate is opposite to the sound output unit in an output direction of the second sound from the sound output unit.

11. The display device according to claim 10, wherein the metal plate of the first lower speaker is inclined downward and diagonally forward with respect to the first lower speaker.

12. The display device according to claim 1, further comprising a second lower speaker and a second bass speaker, wherein
the first upper speaker is spaced apart from the second upper speaker in the horizontal direction,
the first lower speaker is spaced apart from the second lower speaker in the horizontal direction, and
the first bass speaker is spaced apart from the second bass speaker in the vertical direction.

13. The display device according to claim 1, further comprising a second lower speaker and a second bass speaker, wherein
the first upper speaker is spaced apart from the second upper speaker in the horizontal direction,
the first lower speaker is spaced apart from the second lower speaker in the horizontal direction,
the second bass speaker is between the first upper speaker and the first lower speaker.

14. A display device, comprising:
a display screen configured to display an image;
a rear cover on a back surface side of the display screen; and
a first upper speaker between the display screen and the rear cover;
a second upper speaker between the display screen and the rear cover, wherein the first upper speaker is spaced apart from the second upper speaker in a horizontal direction;
a first lower speaker between the display screen and the rear cover;
a second lower speaker between the display screen and the rear cover, wherein the first lower speaker is spaced apart from the second lower speaker in the horizontal direction;
a first bass speaker between the first upper speaker and the first lower speaker in a vertical direction;
a second bass speaker spaced apart from the first bass speaker in the vertical direction, wherein
each of the first bass speaker and the second bass speaker has a sound output band lower than that of each of the first upper speaker and the first lower speaker, and
each of the first bass speaker and the second bass speaker is between the display screen and the rear cover;
an upper slit above the display screen, wherein the upper slit is a passage hole for sound output from the first upper speaker; and
a lower slit below the display screen, wherein
the lower slit is a passage hole for sound output from the first lower speaker, and
the lower slit has a vertical width larger than a vertical width of the upper slit.

15. A display device, comprising:
a display screen configured to display an image;
a rear cover on a back surface side of the display screen; and
a first upper speaker between the display screen and the rear cover;
a second upper speaker between the display screen and the rear cover, wherein the first upper speaker is spaced apart from the second upper speaker in a horizontal direction;
a first lower speaker between the display screen and the rear cover;
a second lower speaker between the display screen and the rear cover, wherein the first lower speaker is spaced apart from the second lower speaker in the horizontal direction;
a first bass speaker;
a second bass speaker, wherein
each of the first bass speaker and the second bass speaker has a sound output band lower than that of each of the first upper speaker and the first lower speaker,
each of the first bass speaker and the second bass speaker is between the first upper speaker and the first lower speaker in a vertical direction, and
each of the first bass speaker and the second bass speaker is between the display screen and the rear cover;
an upper slit above the display screen, wherein the upper slit is a passage hole for sound output from the first upper speaker; and
a lower slit below the display screen, wherein
the lower slit is a passage hole for sound output from the first lower speaker, and
the lower slit has a vertical width larger than a vertical width of the upper slit.

* * * * *